United States Patent Office 2,955,155
Patented Oct. 4, 1960

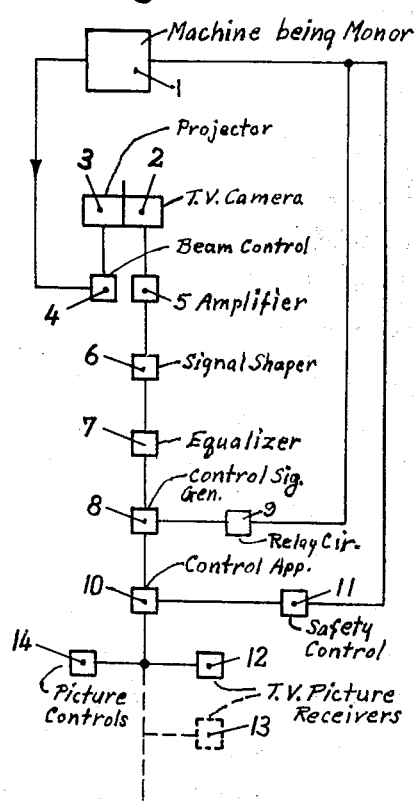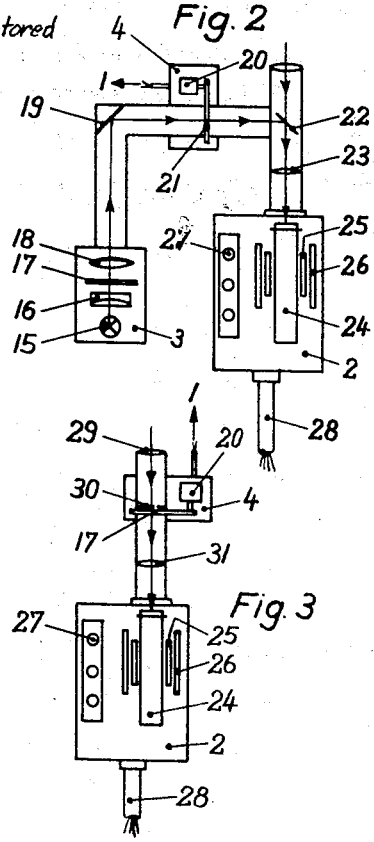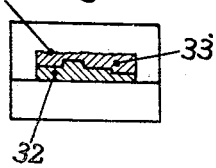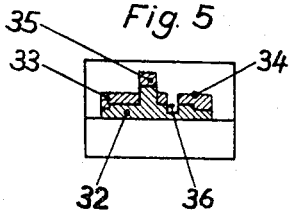

2,955,155

AUTOMATIC MONITORING OF MACHINES BY A TELEVISION SYSTEM

Walter Mayer, Furth, Bavaria, Germany, assignor to Max Grundig, Furth, Germany

Filed Sept. 27, 1957, Ser. No. 686,744

Claims priority, application Germany Oct. 2, 1956

10 Claims. (Cl. 178—6)

The use of modern automatic machines requires control or monitoring (supervisory) arrangements which are absolutely sure in operation. Care must be taken in these machines to see not only that no possible failure occurs but even more important by far is to have a supervisory control at the time such that there shall not occur during the course of operation any defective operation such as would lead to damage or destruction of the machine itself or of its tools which are often expensive.

For the purpose of monitoring or supervising such machines it would be conceivable to station at each of these machines a workman or operator charged only with inspection. This workman would be charged with the continuous responsibility of seeing to it that the blanks or workpieces coming in to be worked on are properly inserted into the machine and that the process to be carried out runs its course according to specifications. In semi automatic or fully automatic plants with long transfer channels or conveyer belts the solution to the problem requires a large number of control-operators upon whom at times a very great burden of responsibility is placed. It is therefore highly desirable to produce monitoring arrangements which will safely assure the avoidance of damage to the machine, and at the same time will provide a centralizing of the monitoring apparatus which will yield substantial gains in economy.

It is also possible to produce an orderly cooperation between the workpiece, the conveyer means and the machine through suitable levers or sensing devices. Such devices are however particularly difficult to replace when adjustments have to be made and they are rather expensive. Moreover, when they are used it may prove possible to have central supervision only by recourse to additional, expensive indicating and control arrangements.

Regulation control check monitoring of such machines and machine channels or conveyer belts can be carried through also by the use of a plurality of television cameras, whereby the pictures produced by these cameras in a relatively simple manner can be checked on the corresponding observation instruments at a central observing point. The observer could then from time to time set into operation suitable control operations. In this solution of the problem also the difficulty lies in the fact that a single person must give the most concentrated attention to watching the different processes and is responsible for the certainty of the operations.

The fundamental problem according to the invention is to develop an automatic supervisory system for machines by means of television equipment which operates entirely automatically and in which the observer exercises only control functions, without however having to be responsible himself for the monitoring or protection of the machines.

According to the invention the problem is worked out in such a way that initially a control picture is made at the same place where a television pickup camera is to be set up for supervisory operation, the lens of the television pickup camera being used to form the control picture of the machine, or of the machine with an untouched or partially or wholly prepared workpiece at a predetermined phase of the work-process, whereby this photographic pickup yields identically the same picture that the television pickup camera does later and that, further, the television pickup camera is provided with a device which makes it possible for a control-picture thus produced or a control negative, at certain instants in the control period, to be superimposed upon or in register with the directly picked up picture, or with a differential picture or the like, on the light-sensitive layer of the television picture pickup tube.

Let us explain in greater detail the process of getting the joint or superimposed picture. Fundamentally, it is possible to resort to either an additive or a subtractive process. In the case of the additive process the light rays which come, on the one hand, from the object itself and, on the other hand from the control picture which is preferably projected as an image, are additive in their effect on the light sensitive layer of the common pickup tube. In case the control picture is formed as a negative, upon registering the control picture with the momentary picture being produced, there is produced as a result of the complementary brightness-distribution a uniform gray to white surface. Bright places of the one picture are compensated or canceled by the corresponding dark places of the other.

When a subtractive process is used, the control picture, preferably in the form of a negative, is applied in the beam path of the lens at the location of a resultant intermediate image. This operates to a certain extent as a filter so that at its dark places little or no light from the object passes through while at its bright places also little or no light from the corresponding dark places of the object comes through. Only the remainder (difference) of the thus filtered light is effective on the light sensitive layer of the pickup tube. The brightness distribution produced there is called a "differential picture." If there is exact registry of the control negative and the directly picked up picture a gray-to-black picture is produced.

This picture or this surface is scanned by a single raster which then yields the picture signal. This picture signal is amplified etc. in known manner. Upon deviation of the direct picture from the control picture or negative a control signal is derived from the picture signal which after suitable shaping, releases and/or controls suitable means for the protection or cutting out of operation of the machine or the like.

Provision can be made for other equipment also which upon a disturbance or dropping out of operation of the supervisory equipment can immediately by suitable switching means throw the supervised machine out of operation.

The process according to the invention will be explained in detail with reference to one embodiment. The supervisory process can for example be embodied in a metal pressing plant which is provided extensively with automatic controls, the problem being to supervise the putting into position of a sheet of metal in a conveyer having a plurality of presses, as a badly inserted sheet can destroy or very seriously damage the tools or an entire power press. The time allowed for controlling the proper position of the workpiece in the press is a time of about one second. During this time the press is still open and all parts are at rest. A photograph is made under these conditions, which after suitable choice of the pickup lens and of the installation positions of the photo camera is identical with the picture that a television camera which is set up later produces at the same stage in the sequence of operations. The television camera can now be supplied with means such that in the second of time allowed for the controls to operate, in addition to the picture produced directly, the photographic picture is produced in exact register as explained hereinbefore preferably as a negative of the previously made received image on the light sensitive layer. By suitable choice of the light-strength of the projection arrangement the light impression on the pickup tube can be compensated to a uniform white or gray surface. For the case when by reason of the incorrect position of the workpiece in the press the directly received picture no longer coincides with the image of the control-negative, the compensation is not complete, and the television camera produces an additional picture signal. Here this additional picture signal can be produced by reason of the fact that at individual points of the picture, the picture content of gray value deviates towards the brighter or darker side. The signal can, after suitable shaping by the use of known processes (for example, by key black-control, amplitude-selection-keyed rectification, differentiation, etc.) be changed over into a control signal which sets into operation suitable control equipment and on proper occasions puts the press-conveyer out of operation. At the same time the connection for the production of a signal is so effected that for the case when the monitoring apparatus breaks down, or the operating voltages fail, an alarm apparatus is tripped so that complete safety for the machine is achieved. At the control position (preferably a central position) the television pictures of all the monitored presses are visible. During the period of operation of the machines the pictures are transferred normally. Only during the moment of control-measurement does the picture on the momentarily-corresponding picture screen disappear. The picture screens serve also for adjusting the cameras and, in case of disturbance, for rapid determination of the cause of the disturbance.

The production of registration of the control negative and the directly received picture can be effected in different ways. It is possible for example to deflect or to project the control-picture or control-negative if necessary through an inclined mirror, semi-transparent if required, onto the light-sensitive layer of the picture pickup tube, so that the normal picture passes rectilinearly through the mirror and so that further means are provided so that the beam path of the projector is released only at predetermined control times. The construction of the mirror can easily be accommodated to the optical system. For example, one can place at the middle of the bundle of rays a normal mirror whose dimensions with respect to the cross section of the bundle of rays is so small that no disturbance of the path of the rays occurs. Also use can be made of a larger mirror which then is formed so it is semi transparent or otherwise. The above mentioned control times can be pre-set by a synchronizing arrangement coupled with the machine. It is also possible in focusing the object on the picture pickup tube to use optical equipment of such type that a part of the optical system produces an intermediate image which then is focused by the second part of the optical system on the picture pickup tube so that at the predetermined control times the control negative is, through a suitable mechanical or similar arrangement, brought to the position of this intermediate image and the differential image thereby produced is focused by the second part of the optical system onto the picture pickup tube. In this way, in the manner explained earlier, a composite (superposed) and completely registering image is guaranteed.

By the free choice of appropiate pickup conditions, for example with respect to total intensity, illumination, etc., as well as by the possibilities of the control picture or control-negative in the course of the photographic process with respect to richness of detail, contrast, density, etc. for getting the maximum possible improvement for the purpose in hand the process is easily adapted to the given problem as occasion arises.

A further development of the invention consists in this, that in a machine there can be controlled not always the same operating condition but also progressive operating conditions. For this purpose the process is usable also on machines which serve not for dressing workpieces (shaping up blanks) but also for example for constructing the power machines themselves and conveyer apparatus, etc. In such machines the recordings of successive steps of the operation are produced, and at the respective control times the picture or negative corresponding to the appropriate step of the operation, together with the picture picked up directly, is focused on the picture pickup tube by suitable means. Preferably the pickup of successive steps of the operation is effected by cinematographic means and the formation of the control pictures or negatives which in practice produce a film is effected by a projector which is so constructed that the beam path of the projector is then interrupted from time to time as the film is advanced. In this way the work of a machine can be controlled in relatively short periods of time and, on the other hand, a continuous picture of the work operations can be exhibited as a result of the inertia of the eyes (persistence of vision) with suitably chosen short switch-over times for the individual pictures (negatives) or the progression-time of the film.

As soon as the condition of the machine at a control-time point does not agree with the corresponding control-picture or control-negative, a control mechanism is released immediately or the machine is brought to a standstill.

In the circuit for producing the control signal care must be taken that on the one hand a certain lower time limit of sensitivity is not exceeded, and on the other hand, however, the circuit does not respond to normal disturbances, for example, noises. As a duration of the picture signal can occur both toward the positive and toward the negative sides, the circuit must be so adjusted that it responds upon occurrence of voltages of the desired polarity. A simple possibility for increasing the margin against disturbance and thereby for increasing the sensitivity consists in producing, by additional light sources whose light is preferably concentrated into a sharp bundle, bright light points and, as the occasion arises, single or multiple reflections of these light points (by suitable light-guide). As machines or their component parts often exhibit only slight differences in brightness, a deviation of condition I from the desired condition produces only a relatively feeble additional picture-signal. By means of the additional bright-lights which provide illumination either constantly or only at the control times a deviation nevertheless produces a very strong signal.

In an arrangement for carrying out the process according to the invention, special attention must be given to the mechanical stability of the optical and electro-optical devices that are used.

In the operation of heavy machines unavoidable oscillations and mechanical shocks occur which could under some circumstances lead to a faulty indication. Accordingly, the television camera and the lens and also the means for projecting the control-picture or control-negative must be connected to one another and also with the entire machine assembly in such a mechanically stable manner that one can with certainty guard against any faulty indications caused by shocks, vibrations and the like. The means needed for this purpose are already known in the field of mechanics and in the machine industry so that no more detailed description is necessary.

In the accompanying drawing the various figures show schematically one embodiment, by way of example, of the component parts and a complete installation of this type of system for carrying out the process according to the invention.

Fig. 1 shows a block circuit representation of a system for the automatic monitoring of machines by means of a television installation according to the invention;

Fig. 2 shows schematically an embodiment of a projector for the control-negative;

Fig. 3 shows a possible embodiment of the lens for the formation of the differential-picture resulting from the control-picture or control-negative and the directly received picture;

Fig. 4 shows schematically a picture signal where the control-picture or control-negative and the direct-picture coincide; and Fig. 5 shows the picture signal resulting from a deviation of the direct pickup from the control-picture or control-negative.

In Fig. 1 the machine to be monitored is represented by the numeral 1. The television camera 2 contains in known manner a picture pickup tube, deflecting and focusing means and also the first amplifier stage. In projector 3 which is connected with the television camera 2 by a suitable optical arrangement, the control-picture is provided in the form of a negative. The transmission of the rays from projector 3 to television camera 2 is blocked or unblocked by a control-stage 4 which is suitably connected with the control means of machine 1, by relays or time switches or other known arrangements and which during the control period, for example by use of a motor, opens the blocked light transmission path between the projector and the television camera that is normally blocked by a shutter. The picture signal produced in the picture pickup tube of the television camera 2 is amplified in a normal amplifier-stage 5 and is suitably shaped in the transmission-stage 6. In the transmission-stage 7 involving an amplitude-equalizing circuit, for example, a control pulse is derived from the picture signal upon a positive or a negative deviation from the mean brightness, which pulse is supplied to the control-signal-generator stage 8. The difference voltage derived from the normal picture signal is applied, either directly or shifted 180° in phase, to the grid or the cathode of an amplifier tube, the anode circuit of which includes a relay or the like which upon blocking of the tube is operated by the picture pulse as a result of the resulting anode current pulse. These relays or the like can then control further circuits which are provided in stage 9 and can, for example by means of thyratron circuits or the like, interrupt the operation of machine 1. At the same time it is possible to derive from stage 9 an alarm signal and to transfer it to the control position or station. The whole picture signal produced by television camera 2 is sent on by stage 7 to the control apparatus 10. This produces the normal picture signal mixture which delivers to the observation equipment (picture tubes) 12 or 13, respectively, the picture of the machine. The numeral 14 designates apparatus to be operated which serves in known manner for adjusting the sensitivity, distinctness, etc. of the reproduced picture. The safety stage 11 is connected between control apparatus 10 and machine 1. This contains known switching means which when the picture signal is lost in control apparatus 10, or when one or all of the operating voltages fail, brings the machine automatically to a standstill.

In Fig. 2 the connection of a projector 3 with the television pickup camera 2 is shown schematically. The television pickup camera 2 contains the picture pickup tube 24, the deflecting means 25, the focusing means 26 and the first amplifier designated by the numeral 27; 28 designates the cable comprising conductors for transmitting the operating voltages, and also the output conductor for the signals. In projector 3, the light source 15 in connection with the condenser 16 and the lens 18 forms an image of the control picture or control negative 17 on the inclined mirror 19. From this mirror 19 the beam is thrown onto the semi-transparent, tilted mirror 22 and thence through lens 23 onto the light sensitive layer of the picture pickup tube 24. In the light beam path, for example between mirrors 19 and 22, is placed the control stage 4 controlled in synchronism with the operation of machine 1. This also controls a motor 20 which moves a shutter 21 into the beam path in the intervals between the control time-periods. The projector 3 can also be formed like the projection apparatus for moving pictures. It contains the equipment normally required for such a projector such as light sources, lens, conveying means, etc. The control equipment 4 then releases the motor 20 in time with the movement of the film so that the shutter 21 opens up the beam path from time to time when a film picture or negative 17 is at rest, and cuts off the beam while a new negative is moved into projecting position.

Fig. 3 represents another possible way of simultaneously focusing the control negative and the directly picked up object. The television camera 2 again contains known arrangements, picture pickup tube 24, deflecting means 25, focusing coil 26, preliminary amplifier stage 27 and camera cable 28. The numeral 29 designates the first part of the lens system which forms an intermediate picture or image of the object at the location 30. The second part 31 of the lens system then forms an image of this intermediate picture on the light sensitive layer of the picture pickup tube 24. At the control period the control-picture 17, preferably in the form of a negative, which has been released by the control stage 4 which may for example control the operation of motor 20, moves into the beam path of the lens by the action of a suitable mechanical device, and this control picture (or control negative) 17 is brought to the position of the intermediate picture 30. A joint focusing of both the control-picture or control-negative and also the driectly picked up picture image produces a resultant difference picture through the second part 31 of the lens system upon the picture tube.

In principle also every other optical arrangement suitable for additive or subtractive image-forming may of course be used for practising the process according to the invention.

In Figs. 4 and 5 is shown schematically by way of example the development of a picture signal of a line which would arise if only the directly picked up picture were focused, where numeral 32 represents the curve of the voltage. Numeral 33 designates the additional portion which arises in an additive process when a control negative is used. Theoretically a pure white picture would be produced, as the positive bright portions of the picture remain uneffected and reversed through the black portions of the negative. In practice however there is produced a more or less uniformly gray picture. The numeral 34 represents the disturbances such as noises and the like which are superposed on the picture signal. In Fig. 5 is shown how differences between the control negative and the directly-picked-up picture bring about a change in the resulting picture signal voltage. Here 35 shows a bright place and 36 a dark place in the course of the line that is represented. From these picture signal amplitudes 35 and 36, which deviate from the reference value, there are derived in stage 7 and stage 8 control signals which through the connecting control stage 9 bring the machine 1 to a standstill and, if desired, cause an alarm signal at the control position.

Figures 4 and 5 thus show in idealized form the picture signal that would arise if it were possible to represent separately the individual picture signal components. Actually however the degree of brightness present from time to time at the place of impingement on the light sensitive layer of the pickup tube is only proportional to the picture signal. With a subtractive process, for instance, the only effective light is that which is left over, called the difference-picture (differential picture) which remains after the filtering of the direct picture through the control picture or control negative.

The process according to the invention is equally suitable for the control of all machining or processing machines such as presses for example, punches, drilling or boring machines, turning lathes and the like. It is just as well adapted for machines in which any kind of rotating or reciprocating elements are to be monitored, for example in power engines, packing machines, conveying mechanisms, etc. It is not limited to the embodiment shown and described by way of example.

What is claimed is:

1. A system for monitoring a machine in a manufacturing operation comprising a television camera positioned to view the workpiece at a point in the manufacturing process where the workpiece is to be in a predetermined condition, thereby producing upon the light-sensitive layer of the camera a direct image of the workpiece, means for simultaneously superimposing upon said layer in registry with said direct image a second image of a previously recorded picture of a workpiece having the correct form for the stage of operation being viewed by the camera, said second image having light intensity values in different portions thereof complemental to the intensity values of corresponding portions of said direct image, said camera including means to scan said light-sensitive layer in successive lines and producing an output current which varies in value in accordance with variation in the light intensity of the elemental areas being scanned, and means controlled by said output current for producing a control current which varies in amplitude in accordance with changes in value of said output current from its average value.

2. A system according to claim 1 wherein the recorded control-picture is a photographic negative of the workpiece.

3. A system for monitoring the operation of a machine in a manufacturing process comprising a television camera positioned to view the workpiece being operated upon by said machine, whereby a direct image of the workpiece is formed upon the light-sensitive layer of the camera, means for simultaneously super-imposing upon said layer in registry with said direct image an image of a previously-recorded photographic negative of a workpiece having the correct form for the stage of operation being viewed by the camera, said camera including means to scan said light-sensitive layer in successive lines and producing an output current which varies in value in accordance with variation in the light intensity of the elemental areas being scanned, and means controlled by said output current for producing a control current which varies in amplitude in accordance with changes in value of said output current from its average value.

4. A monitoring system according to claim 3 and including a semi-transparent mirror positioned to transmit the direct image of the workpiece to the camera and to reflect an image of said recorded negative onto said camera, a shutter normally cutting off the image of said recorded negative, and means for opening said shutter at predetermined control times.

5. A monitoring system according to claim 3 wherein said photographic negative is positioned in the path of the rays of said direct image at the location of an intermediate image plane of said camera.

6. A monitoring system according to claim 3 and including additional light sources for producing bright light-points on said workpiece to increase the sensitivity of said system.

7. A monitoring system according to claim 3 and including a television picture tube for reproducing the image of said workpiece in said machine at a central point of observation.

8. A monitoring system according to claim 3 and including additional cameras located to pick-up pictures of the workpieces at different points in the manufacturing process, and at least one television picture tube at a central point of observation for reproducing the pictures picked-up by said cameras.

9. A monitoring system according to claim 3 wherein said previously-recorded photographic picture comprises a motion picture film containing a series of control pictures representing successive stages in the manufacturing process, and a motion picture projector for moving said film in step to superimpose different control pictures upon the direct image formed on said sensitive layer at predetermined control times, said projector including a shutter operating to cut off the beam of the projector during film-shifting intervals.

10. A monitoring system according to claim 3 and including a semi-transparent mirror positioned to transmit the direct image of the workpiece to the camera and to reflect an image of said recorded negative onto said camera.

References Cited in the file of this patent

UNITED STATES PATENTS

| 1,806,199 | Hardy | May 19, 1931 |
| 2,026,330 | Tauschek | Dec. 31, 1935 |
| 2,648,723 | Goldsmith | Aug. 11, 1953 |
| 2,679,636 | Hillyer | May 25, 1954 |
| 2,772,600 | Walker | Dec. 4, 1956 |